(12) United States Patent
Hanish et al.

(10) Patent No.: US 9,299,158 B2
(45) Date of Patent: Mar. 29, 2016

(54) AUTOMATED ANALYSIS OF A MOTION

(71) Applicant: Coley Sports and Entertainment LLC, Raleigh, NC (US)

(72) Inventors: Tyson Hanish, Raleigh, NC (US);
Robert Schulte, Raleigh, NC (US);
Richard Davis, Durham, NC (US);
Melissa A. Schulte, Raleigh, NC (US)

(73) Assignee: Coley Sports and Entertainment LLC, Raleigh, NC (US)

( * ) Notice: Subject to any disclaimer, the term of this patent is extended or adjusted under 35 U.S.C. 154(b) by 117 days.

(21) Appl. No.: 13/838,513

(22) Filed: Mar. 15, 2013

(65) Prior Publication Data

US 2014/0219570 A1    Aug. 7, 2014

Related U.S. Application Data

(60) Provisional application No. 61/759,603, filed on Feb. 1, 2013.

(51) Int. Cl.
*G06K 9/46* (2006.01)
*G06T 7/20* (2006.01)

(52) U.S. Cl.
CPC .......... *G06T 7/2033* (2013.01); *G06T 2200/24* (2013.01); *G06T 2207/10016* (2013.01); *G06T 2207/20101* (2013.01); *G06T 2207/30196* (2013.01); *G06T 2207/30221* (2013.01)

(58) Field of Classification Search
CPC ............................................... G06K 2209/21
See application file for complete search history.

(56) References Cited

U.S. PATENT DOCUMENTS

| | | | |
|---|---|---|---|
| 2004/0096085 A1* | 5/2004 | Matsumoto et al. | 382/107 |
| 2005/0215336 A1* | 9/2005 | Ueda et al. | 473/131 |
| 2009/0231453 A1* | 9/2009 | Huang | 348/220.1 |
| 2013/0178304 A1* | 7/2013 | Chan | 473/266 |

OTHER PUBLICATIONS

Juliet McDaniel, "A Swing and a Hit," UNIBusiness, The Alumni Magazine of the College of Business Administration University of Northern Iowa, 2010-2011.*
Jim McLean, "Two of a Kind: Tiger Woods & Rory McIlroy," Golf Digest, Dec. 2012, http://www.golfdigest.com/golf-instruction/swing-sequences/2012-12/photos-tiger-woods-rory-mcilroy#intro.*
Hanish, Tyson, "Activities of Tyson Hanish," Jan. 2009, 1 page.
Author Unknown, "UNI Student Wins National Elevator Pitch Competition," UNIBusiness News, Nov. 13, 2008, 2 pages, http://business.uni.edu/web/pages/news.cfm?ID=404.
Author Unknown, "A Swing and a Hit," UNI Business Alumni Profiles, Jan. 28, 2013, 2 pages, http://business.uni.edu/web/pages/about/alumniprofile.cfm?ProfileID=171.

* cited by examiner

*Primary Examiner* — Andrew Moyer
(74) *Attorney, Agent, or Firm* — Withrow & Terranova, PLLC

(57) ABSTRACT

Generating an analysis of a motion is disclosed. A first computing device receives image data that includes a set of user images. Each user image in the set corresponds to a stage of a plurality of consecutive stages of the motion and depicts a user at the corresponding stage. For each stage of the plurality of consecutive stages, a plurality of motion point locations in the corresponding user image is determined. Based on the plurality of motion point locations and reference motion data associated with a reference motion, a user motion report is generated.

14 Claims, 16 Drawing Sheets

MYSWING ANALYSIS DEPTH REPORT

STANCE    126 out of 158 points

| Pro Player Stance Picture | User Stance Picture |

Good balance on your back foot. Right knee is inside of right foot which is good position. Good weight balance through the ball of your back foot.

No suggestions, you did great!

Your hips are not level. Your right hip is too far above your left. This will cause your swing path to be too downhill.

Your hips should be level.

*FIG. 12*

| | Stage # 156 | Chunk # 158 | Pos or Neg? 160 | Pos or Neg? 162 Pos=1, Neg=0 | Level of Neg 164 Pos=0, N1=1,N2=2 | Template # 166 | Overall Priority 168 | Chunk Priority 170 In Stage | Points 172 | Points 174 Rounded |
|---|---|---|---|---|---|---|---|---|---|---|
| | STAGE 1 | | | | | | | | | |
| 154-1→ | 1 | 1 | P | 1 | 0 | 1 | 59 | 8 | 9.51 | 10 |
| 154-2→ | 1 | 1 | N2 | 0 | 2 | 2 | 59 | 8 | 1.9 | 2 |
| | 1 | 1 | N1 | 0 | 1 | 3 | 59 | 8 | 6.66 | 7 |
| | 1 | 1 | N1 | 0 | 1 | 4 | 59 | 8 | 6.66 | 7 |
| | 1 | 1 | N2 | 0 | 2 | 5 | 59 | 8 | 1.9 | 2 |
| | ... | ... | ... | ... | ... | ... | ... | ... | ... | ... |
| | 1 | 3 | P | 1 | 0 | 11 | 56 | 5 | 9.61 | 10 |
| | ... | ... | ... | ... | ... | ... | ... | ... | ... | ... |
| 154-N→ | 1 | 6 | N2 | 1 | 2 | 21 | 58 | 7 | 1.91 | 2 |

*FIG. 15A*

| *FIG. 15A* | *FIG. 15B* |
|---|---|

*FIG. 15*

| Output | To Fix | Dependencies |
|---|---|---|
| Good balance on your back foot. Back knee is inside of back foot which is good position. Good weight balance through the ball of your back foot. | No fix needed. | |
| Your balance is too far forward at stance. Your back knee is much too far forward and low or your feet placement is too wide. | Stand up taller and have a more comfortable balance. Or move your feet closer together. | |
| Your balance is too far forward at stance. Or, your feet placement is too wide. | Stand up taller and have a more comfortable balance. Or move your feet closer together. | |
| Your weight is too far back. You are too flat-footed. | Shift weight forward to a more centered position. You should feel the weight on the ball of your back foot. | |
| Your weight is much too far back. You back knee is behind your back foot. | Shift weight forward to a more centered position. Avoid pointing your back knee toward the catcher. Make sure your feet are square and pointing toward the plate. | |
| ... | ... | ... |
| Good balance, with your weight centered. | Nothing. You back knee is inside of your back foot. | (1,1) |
| ... | ... | ... |
| Your weight is much too far backward. Either your feet are too close together or your weight is too far backward. | Move your weight back to a much more centered and balanced position. | |

*FIG. 15B*

AUTOMATED ANALYSIS OF A MOTION

RELATED APPLICATIONS

This application claims the benefit of provisional patent application Ser. No. 61/759,603, filed Feb. 1, 2013, the disclosure of which is hereby incorporated herein by reference in its entirety.

TECHNICAL FIELD

The embodiments generally relate to an automated analysis of a motion for causing the movement of a sports article associated with a sport. The automated analysis is capable of providing an analysis substantially in real-time based on imagery depicting a motion of a user.

BACKGROUND

Many individuals strive to improve their performance in a sport by emulating professional athletes. Many sports involve particular motions that are intended to cause the movement of a sports article, such as a baseball, a tennis ball, a bowling ball, a golf ball, and the like. Some motions involve the swinging of a sports implement, such as a baseball bat or a tennis racket. Other motions, such as throwing a football, may not involve the use of a sports implement. Coaches may analyze an athlete's swing and provide input to the athlete regarding improvements. Unfortunately, this can be time-consuming and costly, and the skill sets of coaches can vary widely. Moreover, a qualified coach is not always readily available, or within the financial means of an athlete. Accordingly, there is a need for automated motion analysis mechanisms that can provide an analysis of a user's motion for causing the movement of a sports article associated with a sport, and provide feedback regarding the adequacy or effectiveness of the motion substantially in real-time.

SUMMARY

The embodiments relate to an automated analysis of a motion associated with the movement of a sports article, such as a baseball, a football, a golf ball, a tennis ball, or the like. In one embodiment, a first computing device receives image data that includes a set of user images. Each user image in the set corresponds to a particular stage of a plurality of consecutive stages of a motion, and depicts a user at the corresponding stage. For example, if the motion being analyzed is a baseball swing, each user image in the set may correspond to a stage of a baseball swing, such as a stance stage, a timing transition stage, a hitting position stage, a rotation stage, a contact stage, or an extension stage.

For each stage of the plurality of consecutive stages, a plurality of motion point locations in the user image that corresponds to the respective stage is determined. Based on the motion point locations and reference motion data associated with a reference motion, a user motion report is generated.

In one embodiment, the image data comprises a video file. The first computing device receives the video file and extracts a plurality of user images from the video file. The first computing device may then provide the plurality of user images to a second computing device for presentation to the user. The user may scroll through the plurality of user images and select the set of user images. The first computing device then receives, from the second computing device, a plurality of image identifiers that identify the set of user images from the plurality of user images.

In another embodiment, image processing software may process the video file to generate a plurality of user images, and identify the set of user images from the plurality of user images without user involvement.

In yet another embodiment, the user may generate a set of user images that depicts the user at each stage of the plurality of consecutive stages of the motion. The user may then upload the set of user images.

In one embodiment, the plurality of motion point locations are determined by receiving, for each stage of the plurality of consecutive stages, a set of motion point designators. Each motion point designator in the set of motion point designators designates a motion point location in the user image that corresponds to the respective stage.

In one embodiment, the user may generate the set of motion point designators for each stage. In particular, for each stage of the plurality of consecutive stages, the user may be presented with an image of a player that depicts the player at the respective stage, and that depicts locations of a plurality of motion points on the player image. A respective user image may also be presented next to the player image. The user may then designate corresponding locations on the respective user image by placing motion point designators at the respective corresponding locations.

In one embodiment, generating the user motion report includes, for each stage of the plurality of consecutive stages, comparing at least two motion point locations to reference motion data. Based on the comparison, a particular template is accessed. A comparison sub-score is determined based on the particular template. Each stage may involve the determination of multiple sub-scores. The sub-scores of each stage may be aggregated to determine a stage score. A plurality of stage scores may be aggregated to determine a cumulative user motion score, which may then be provided to the user in the user motion report.

In one embodiment, a tip for improving the sub-score may be determined based on the particular template, and the user motion report may include the tip.

In yet another embodiment, a selection of a comparison player may be received from the user. A set of player images that is associated with the comparison player may be obtained. Each player image in the set of player images depicts the comparison player at a particular stage of the plurality of consecutive stages of the motion. The user motion report may include a plurality of image pairs, each image pair including a user image from the set of user images that corresponds to a particular stage of the plurality of consecutive stages and a player image from the set of player images that corresponds to the particular stage. The user motion report may also include a stage score for each stage of the plurality of consecutive stages that identifies a score of the user based on the motion point locations on the user image that corresponds to the particular stage.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 12 is an example user interface that may present additional information from the user motion report;

FIGS. 15A-15B illustrate example templates according to one embodiment.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The embodiments relate to an automated analysis of a motion associated with the movement of a sports article, such as a baseball, a football, a golf ball, a tennis ball, or the like. In some embodiments, the motion being analyzed involves the use of a sports implement to cause the movement of a sports article. As used herein, "sports implement" refers to an item that is not part of a user's body, but that is manipulated by the user to effect the motion of the sports article. Non-limiting examples of sports implements include a tennis racket, a golf club, a baseball bat, a hockey stick, or the like.

However, the embodiments are not limited to motions that require a sports implement, and are applicable to any motion intended to cause the movement of a sports article, including those motions that involve the use of a sports implement, such as striking a tennis ball, a golf ball, a baseball, or a hockey puck, and those that do not, such as throwing a football or kicking a soccer ball. Moreover, certain sports involve the use of a sports implement for one type of motion and not another. For example, the embodiments will be described herein in the context of a baseball swing, wherein a user uses a sports implement, in particular a baseball bat, to cause the movement of a sports article, specifically, a baseball. However, the embodiments herein may also be used to analyze the motion associated with throwing a baseball, which is a motion for causing the movement of a sports article, specifically a baseball, but does not involve the use of a sports implement.

Figure 1:
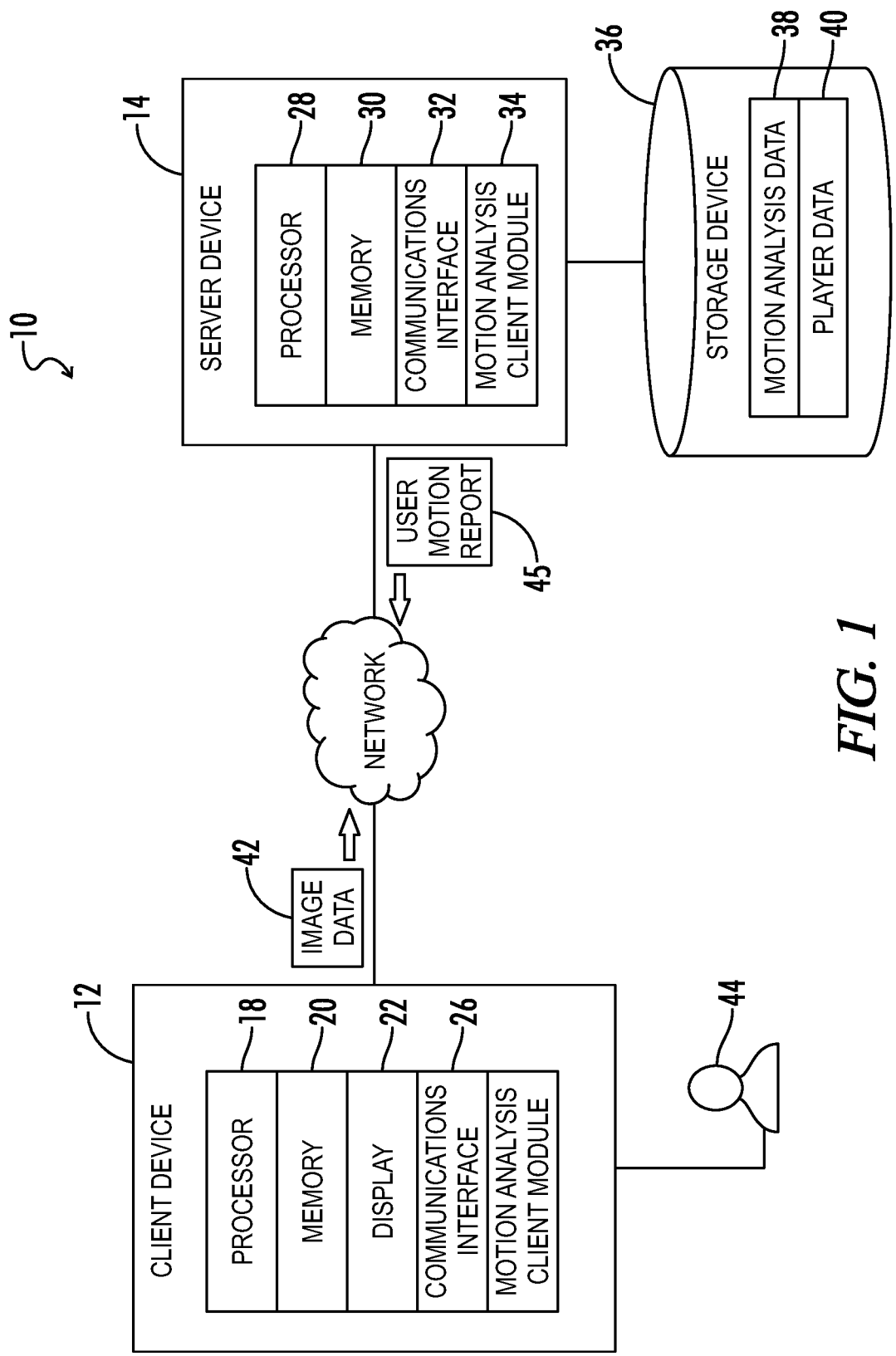
FIG. 1 is a block diagram of a system in which embodiments may be practiced.

FIG. 1 is a block diagram of a system 10 in which embodiments may be practiced. The embodiments disclosed in FIG. 1 involve the use of a sports implement, in particular a baseball bat. The system 10 includes a client device 12, a server device 14, and a network 16, which facilitates communication between the client device 12 and the server device 14. The client device 12 may comprise any processing or computing device suitable for implementing the functionality described herein, and may comprise, by way of non-limiting example, a laptop or desktop computer; a smartphone; a computer tablet; a gaming system such as the Nintendo® Wii™, Microsoft®Xbox™, or Sony® PlayStation™; or a video camera such as a Flip Video™ camera, a GoPro® camera, or the like. Similarly, the server device 14 may comprise any processing or computing device suitable for implementing the functionality described herein.

The server device 14 may be referred to herein as a first computing device and the client device 12 as a second computing device. The use of ordinals through the specification, such as "first" or "second" is solely for purposes of distinguishing between different elements, and does not imply a priority, importance, or any other characteristic unless specifically otherwise disclosed herein. The embodiments will be discussed in the context of a client-server architecture, where certain functionality may be performed by the client device 12, and other functionality by the server device 14. However, in a client-server architecture, which particular device performs specific functionality may be system dependent, and thus in some embodiments, functionality attributed to the server device 14 may be performed by the client device 12 in other embodiments, and vice versa. Moreover, the embodiments are not limited to a client-server architecture, and in some embodiments may be implemented via a single computing device such as the client device 12.

The network 16 represents any one or more public or private networks suitable for communicating data, as described in greater detail herein, between the client device 12 and the server device 14.

The client device 12 includes a processor 18, which may comprise any suitable processor or micro-processor, a memory 20, and a display 22. In one embodiment, the memory 20 may store programming instructions suitable for implementing functionality described herein. In one embodiment, functionality may be provided via a web browser, such as Internet Explorer®, based at least in part on data, such as Hypertext Markup Language (HTML) instructions, sent to the client device 12 by the server device 14. In other embodiments, the functionality may be provided by a program application, such as a motion analysis client module 24. The motion analysis client module 24 may be loaded onto the client device 12, such as via a download via the network 16, for example. In other embodiments, functionality may be implemented via circuitry, such as an Application Specific Integrated Circuit (ASIC), Field-Programmable Gate Array (FPGA), or the like. For purposes of illustration, functionality provided by the client device 12 will be attributed to the client device 12 rather than any particular component of the client device 12. The client device 12 may also include a communications interface 26, which is configured to communicate with the network 16 and may comprise any suitable network transceiver or transceivers sufficient to communicate with the network 16 and otherwise communicate data with any suitable device.

The server device 14 includes a processor 28, which may comprise any suitable processor or micro-processor, a memory 30, and a communications interface 32. In one embodiment, the memory 30 may store programming instructions suitable for implementing functionality described herein. In one embodiment, the functionality may be provided by a motion analysis server module 34. In other embodiments, functionality may be incorporated in circuitry, such as an ASIC, or the like. The communications interface 32 is configured to communicate with the network 16 and may comprise any suitable network transceiver or transceivers sufficient to communicate with the network 16, and otherwise communicate data with any suitable device. The server device 14 may also include, or be communicatively coupled to, a storage device 36, on which information used according to some embodiments, such as motion analysis data 38, swing analysis parameters, and player data 40, may be stored. For purposes of illustration, the functionality of the server device 14 will be attributed generally to the server device 14, irrespective of which component or components of the server device 14 provides the functionality.

Generally, the embodiments relate to analyzing data that quantifies a user motion to reference motion data that quantifies a reference motion, and, based on the analysis, generating a user motion report that quantifies or otherwise assesses the user motion. The determination of the reference motion data, according to one embodiment, may be performed in any desirable manner. In one embodiment, a motion is broken down into stages. The particular stage breakdown may be dependent, in part, on the complexity of the motion. For example, a baseball swing may be broken into a stance stage, a timing transition stage, a hitting position stage, a rotation stage, a contact stage, and an extension stage, according to one embodiment. A baseball throwing motion, on the other hand, may comprise a stance stage, a cocking phase, an initiation phase, and a follow-through stage. The breakdown of a motion into consecutive stages may be determined, for example, by one skilled in the particular motion at issue, such as a professional athlete, a coach, a person with knowledge of body mechanics, or the like.

Body parts and/or parts of a sports implement that are relevant in determining how similar or different a user's motion is to a reference motion are then identified for each stage. These may be referred to herein as motion points. Thus, motion points relevant to the stance stage of a baseball swing may be the right and left feet, the right and left shoulders, and the rightmost and leftmost points of the hips. A sports implement, or a portion thereof, such as the barrel of a bat, may also be a motion point. The identification of motion points for each stage may be determined, for example, by one skilled in the particular motion at issue, such as a professional athlete, a coach, a person with knowledge of body mechanics, or the like.

Reference motion data is then generated that identifies preferable relationships between motion points at each stage of a reference motion. The reference motion data may be generated, for example, by analyzing the motions of many professional athletes performing the motion. For example, images of a plurality of professional athletes each swinging a baseball bat may be obtained. Images of the professional athletes at each stage may then be analyzed to determine the reference motion data at each stage. For example, it may be determined that during the stance stage, the distance between the right and left feet of a professional athlete is typically 1.5 times the width of his shoulders. As another example, it may be determined that the left foot of a professional athlete is at a particular location with respect to another body part of the professional athlete during the timing transition stage. Again, the identification or determination of such reference motion data may be performed by one skilled in making such determinations, such as a professional athlete, a coach, a person with knowledge of body mechanics, or the like. The reference motion data may then be stored for use in embodiments disclosed herein.

Figure 2:
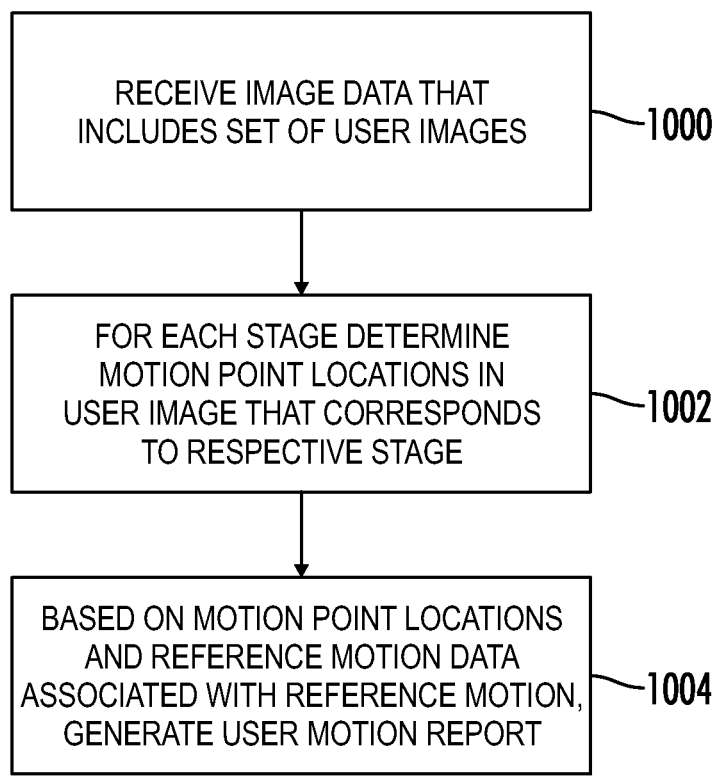
FIG. 2 is a flow chart illustrating a method for generating an analysis of a motion according to one embodiment.

FIG. 2 is a flow chart illustrating a method for generating an analysis of a motion according to one embodiment. FIG. 2 will be discussed in conjunction with FIG. 1. The server device 14 receives from the client device 12 image data 42 that includes a set of user images (FIG. 2, block 1000). Each user image in the set of user images corresponds to a particular stage of a plurality of consecutive stages of the motion, and depicts a user 44 at the corresponding stage. The image data 42 may comprise user images, or video data from which the user images may be derived.

In one embodiment, the image data 42 may comprise a video file of the user 44 performing the motion. For example, the video file may be a video file of the user 44 swinging a baseball bat. The video file may be provided to the server device 14, which processes the video file to extract from the video file a plurality of user images. The server device 14 may provide the plurality of user images to the client device 12 for presentation to the user 44. The client device 12 receives the plurality of user images, and presents them to the user 44. In one embodiment, the client device 12 may allow the user 44 to scroll through the plurality of user images to facilitate selection of the set of user images. The client device 12 may also present to the user 44 player images that depict a particular player at the respective stages of the motion to aid the user 44 in selecting user images that are at analogous, or corresponding, stages of the motion.

After the user 44 selects the set of user images from the plurality of user images, the client device 12 may provide image identifiers to the server device 14 that identify the set of user images. The image identifiers may comprise the selected set of user images, or references that uniquely identify the selected set of user images.

In another embodiment, the image data 42 comprises a video file of the user 44 performing the motion, such as swinging a baseball bat, and the server device 14 processes the video file to generate a plurality of user images. The server device 14 then, utilizing image analysis software for example, automatically identifies the set of user images from the plurality of user images, without involvement of the user 44.

In yet another embodiment, the user 44 may generate the set of user images, and input the set of user images into the client device 12. In such embodiment, the image data 42 comprises the set of user images provided by the user 44.

For each stage of the plurality of consecutive stages, the server device 14 determines motion point locations in the user image that corresponds to the respective stage (FIG. 2, block 1002). A motion point location is the location of a motion point in the respective image, ultimately for comparison to that of reference motion data, as will be discussed in greater detail herein. In one embodiment, the user 44 may designate the location of motion points using motion point designators. In particular, the client device 12 may depict, for example, an image of a professional athlete in a stance stage. The client device 12 may also depict the user image in the set of user images that corresponds to the stance stage. The image of the professional athlete may bear a number of motion point designators, each of which is located at a relevant motion point of the professional athlete. The motion point designators may have any desired shape or color and, for example, may comprise a circle with a cross-hair.

For example, assume that the motion points relevant to a stance stage include the right and left feet, and the rightmost and leftmost points of the shoulders. The image of the professional athlete may bear motion point designators at those respective locations on the image of the athlete. The user 44 may drag a particular motion point icon to the analogous location on the user image. For example, the user 44 may drag and drop the motion point designator from the right foot of the athlete to the right foot of the user 44. This may be repeated for each motion point of each stage of the motion. The client device 12 may then provide to the server device 14 the locations of the motion point designators with respect to the depicted image on which the respective motion point designator was placed by the user 44. The locations may be expressed in any desirable manner, such as by x,y coordinates with respect to the image that corresponds to the particular stage. In this embodiment, the server device 14 determines the motion point locations by receiving the motion point locations from the client device 12.

In another embodiment, the client device 12, or the server device 14, may automatically analyze the user images in the set of user images and identify the motion point locations without user input.

Based on the motion point locations and the reference motion data associated with the reference motion, the server device 14 generates a user motion report 45 (FIG. 2, block 1004). Aspects of example user motion reports will be discussed in greater detail herein.

Figure 3:
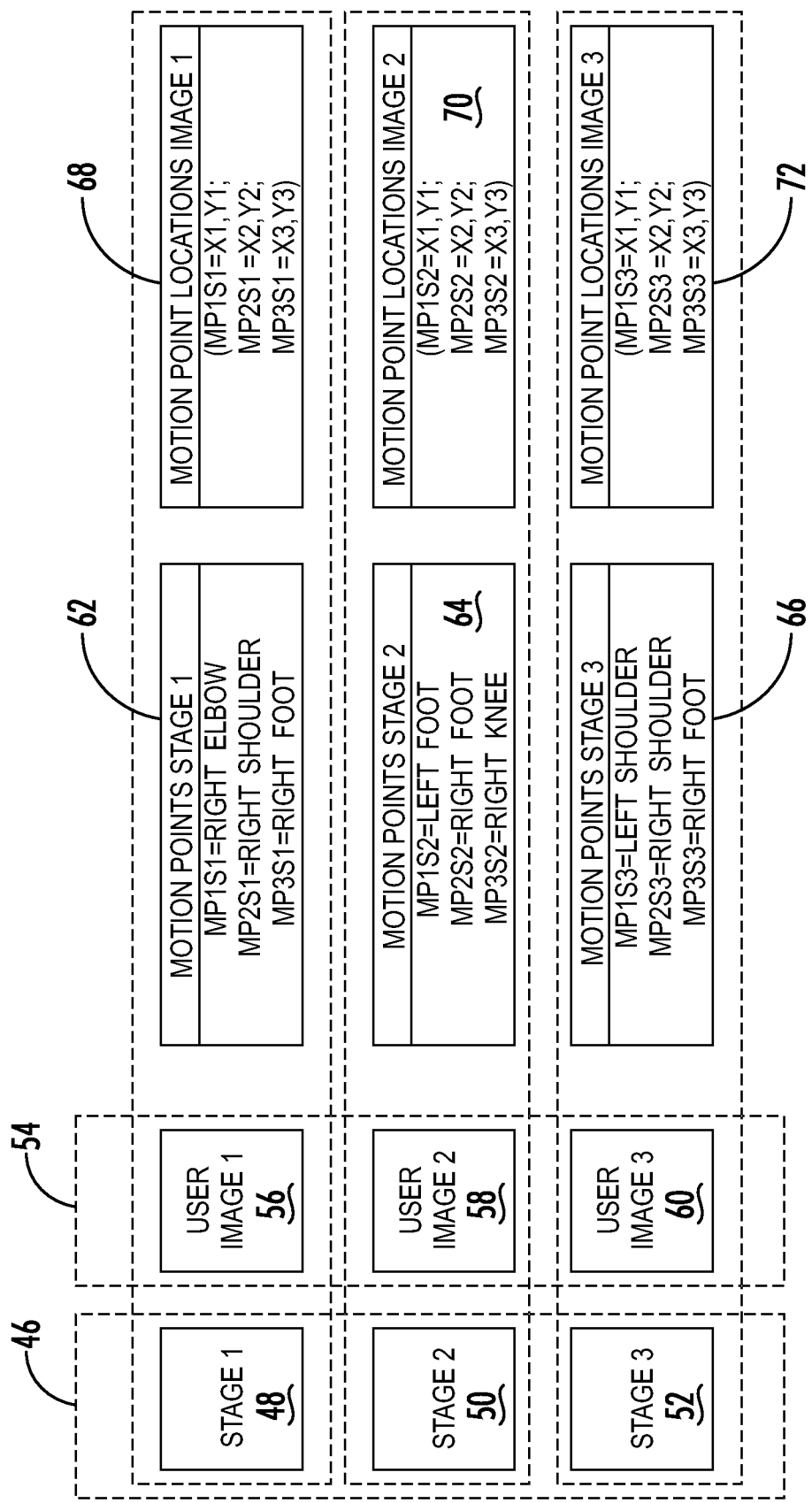
FIG. 3 is a block diagram illustrating relationships or correspondences between elements in a representative motion according to one embodiment.

FIG. 3 is a block diagram illustrating relationships or correspondences between various elements discussed herein in the context of a representative motion according to one embodiment. The representative motion comprises a plurality 46 of consecutive stages 48-52. A set 54 of user images 56-60 is determined. Each user image 56-60 in the set 54 corresponds to one of the stages 48-52. In particular, the user image 56 corresponds to the stage 48, the user image 58 corresponds to the stage 50, and the user image 60 corresponds to the stage 52. Each user image 56-60 depicts the user 44 at the corresponding stage 48-52 during the motion. A plurality of motion points 62 also corresponds to stage 48, a plurality of motion points 64 corresponds to stage 50, and a plurality of motion points 66 corresponds to stage 52. The pluralities of motion points 62-66 identify body parts and/or parts of a sports implement that are relevant to the corresponding stages 48-52. A plurality of motion point locations 68 that correspond to the motion points 62 and identify the locations of the corresponding motion points 62 in the corresponding user image 56 are then determined. A plurality of motion point locations 70 that correspond to the motion points 64 and identify the locations of the corresponding motion points 64 in the corresponding user image 58 are determined. A plurality of motion point locations 72 that correspond to the motion points 66 and identify the locations of the corresponding motion points 66 in the corresponding user image 60 are determined.

The pluralities of motion point locations 68-72 may then be compared to the reference motion data to determine similarities thereto, and assess or otherwise qualify the user motion with respect to a reference motion.

In one embodiment, the client device 12 may present to the user 44 one or more user interfaces to facilitate the automated analysis of a motion. FIGS. 4-10 illustrate example user interfaces via which may be presented to the user 44 according to one embodiment. In this embodiment, the process may begin via entry, by the user 44 at the client device 12, of a uniform resource location (URL) associated with the server device 14. In one embodiment, the server device 14 may send to the client device 12 a series of messages that the client device 12 may present to the user 44. The series of messages, for example, may be HTML pages, or other suitable information that the client device 12 can interpret and display to the user 44, via a browser running on the client device 12 for example.

Figure 4:
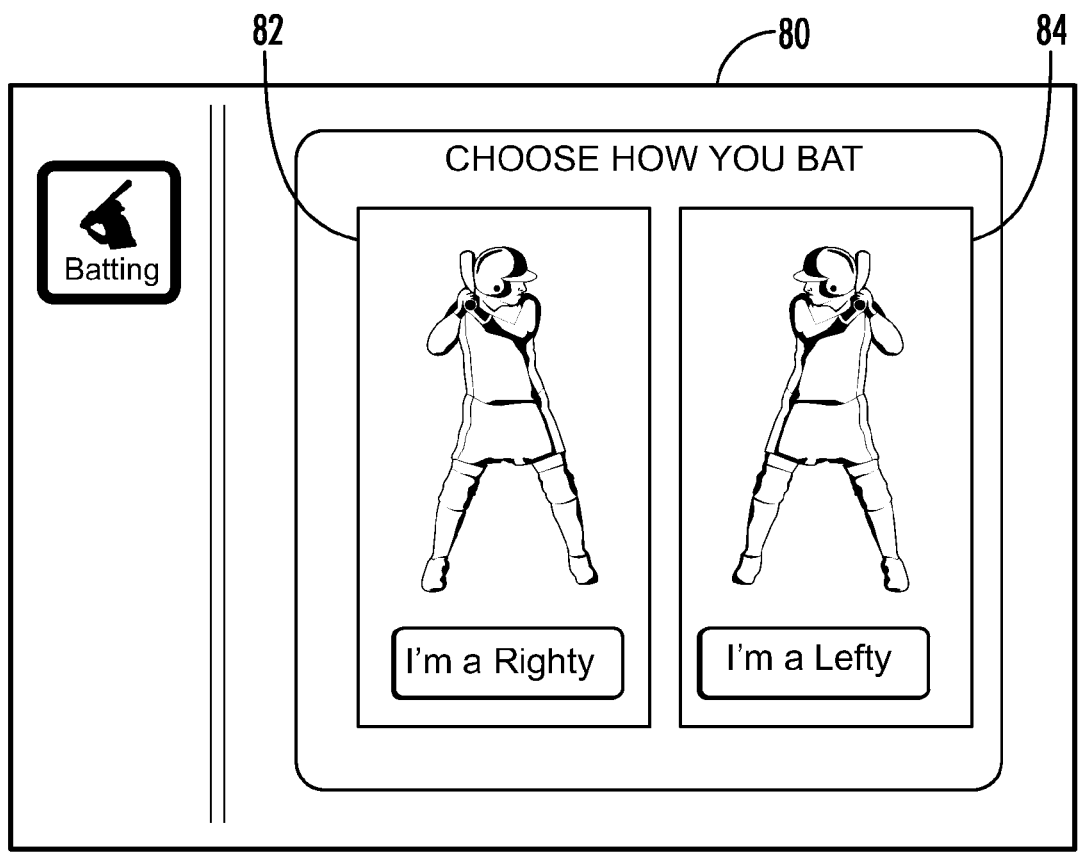
FIG. 4 is an example user interface according to one embodiment wherein a user may indicate from which side of the baseball plate the user bats.

FIG. 4 is an example user interface 80 according to one embodiment wherein the user 44 may indicate from which side of the baseball plate the user 44 bats. In particular, the user 44 may select a right-handed batter icon 82 or a left-handed batter icon 84 to indicate whether the user 44 bats from the right side of the baseball plate or the left side of the baseball plate, respectively. As will be discussed in greater detail herein, in some embodiments the user 44 may select a comparison player from a plurality of players against which images of various stages of the motion of the user 44 will be depicted. If the selected comparison player bats from a different side of the plate than the user 44, the server device 14 may reverse the images of the user 44 so that when images of the user 44 are presented in association with corresponding images of the comparison player, the images of the user 44 depict the user 44 batting from the same side of the plate as the comparison player.

Figure 5:
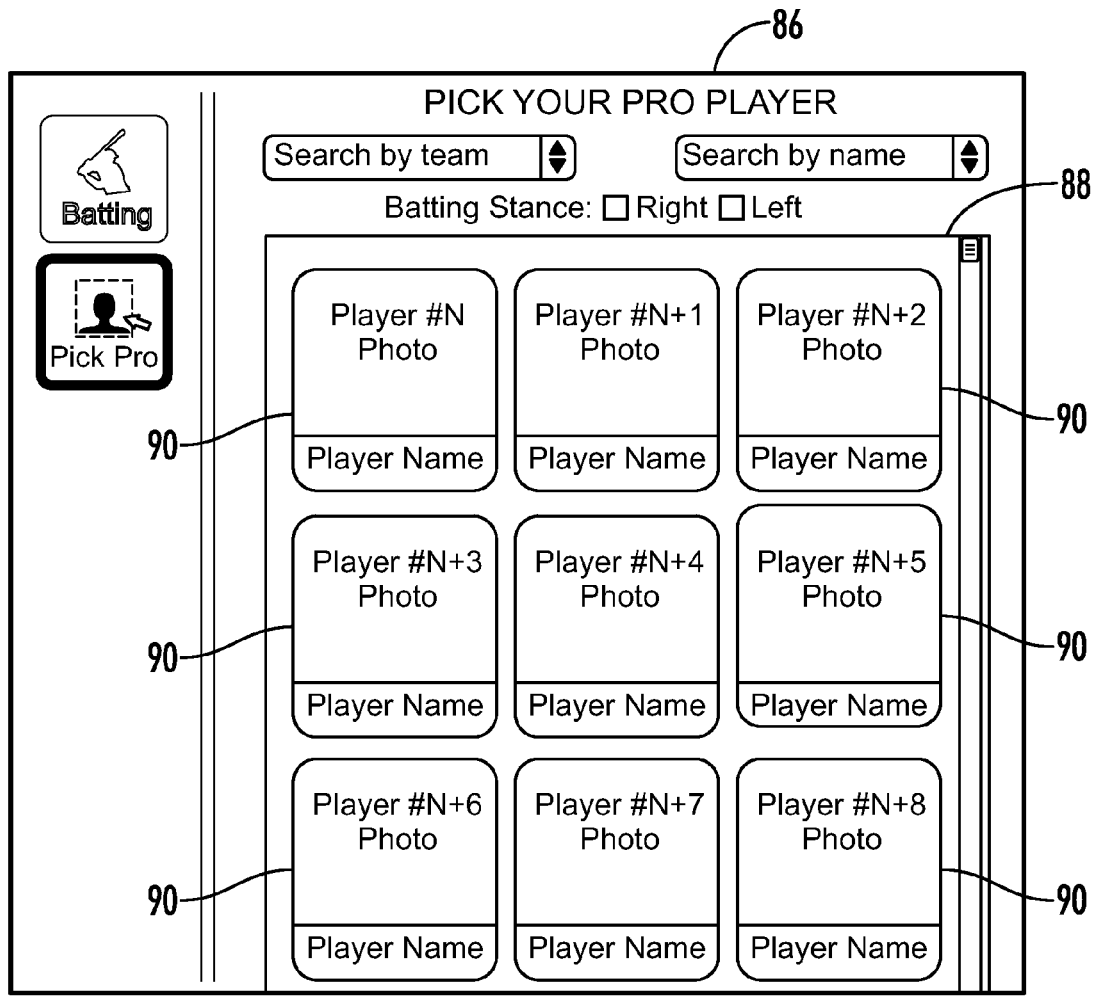
FIG. 5 is an example user interface according to one embodiment for facilitating selection of a comparison player from a plurality of players.

FIG. 5 is an example user interface 86 according to one embodiment for facilitating selection of the comparison player from the plurality of players. The user interface 86 includes a scrollable list 88 of player images 90. In one embodiment, the player images 90 may comprise current and/or past professional athletes associated with the sport in which the motion is used. The user 44 may select a particular player image 90. The client device 12 communicates the selection to the server device 14, which may then access the player data 40 and obtain a set of player images that correspond to the selected player image 90, for subsequent presentation to the user 44, as illustrated in greater detail herein. The user interface 86 may also allow the user 44 to search for a particular player image 90 via name or by team, or may allow the user 44 to filter out certain player images based on any desirable criteria, such as the side of the plate from which the player bats.

In one embodiment, the user 44 may input to the client device 12 a video of the user 44 performing the motion. For example, the user 44 may direct the client device 12 to a local storage coupled to the client device 12 that contains a video file of the user 44 swinging a baseball bat. The client device 12 may input the video file, and may direct the user 44 to crop the video to eliminate portions of the video that precede the first stage of the motion, such as the user 44 walking up to the plate, as well as portions of the video that are subsequent to the final stage of the motion, to reduce the size of the uploaded file. The client device 12 may also allow, or direct, the user 44 to scale the video so that the portion of the video depicting the user 44 is a certain size within the video. The client device 12 may then generate a new cropped and scaled video file, and provide the video file to the server device 14. The server device 14, in such an embodiment, may then extract from the video file a plurality of user images that consecutively depict the user 44 performing the motion. In other embodiments, the extraction of the plurality of user images may be performed on the client device 12 rather than the server device 14.

Figure 6:
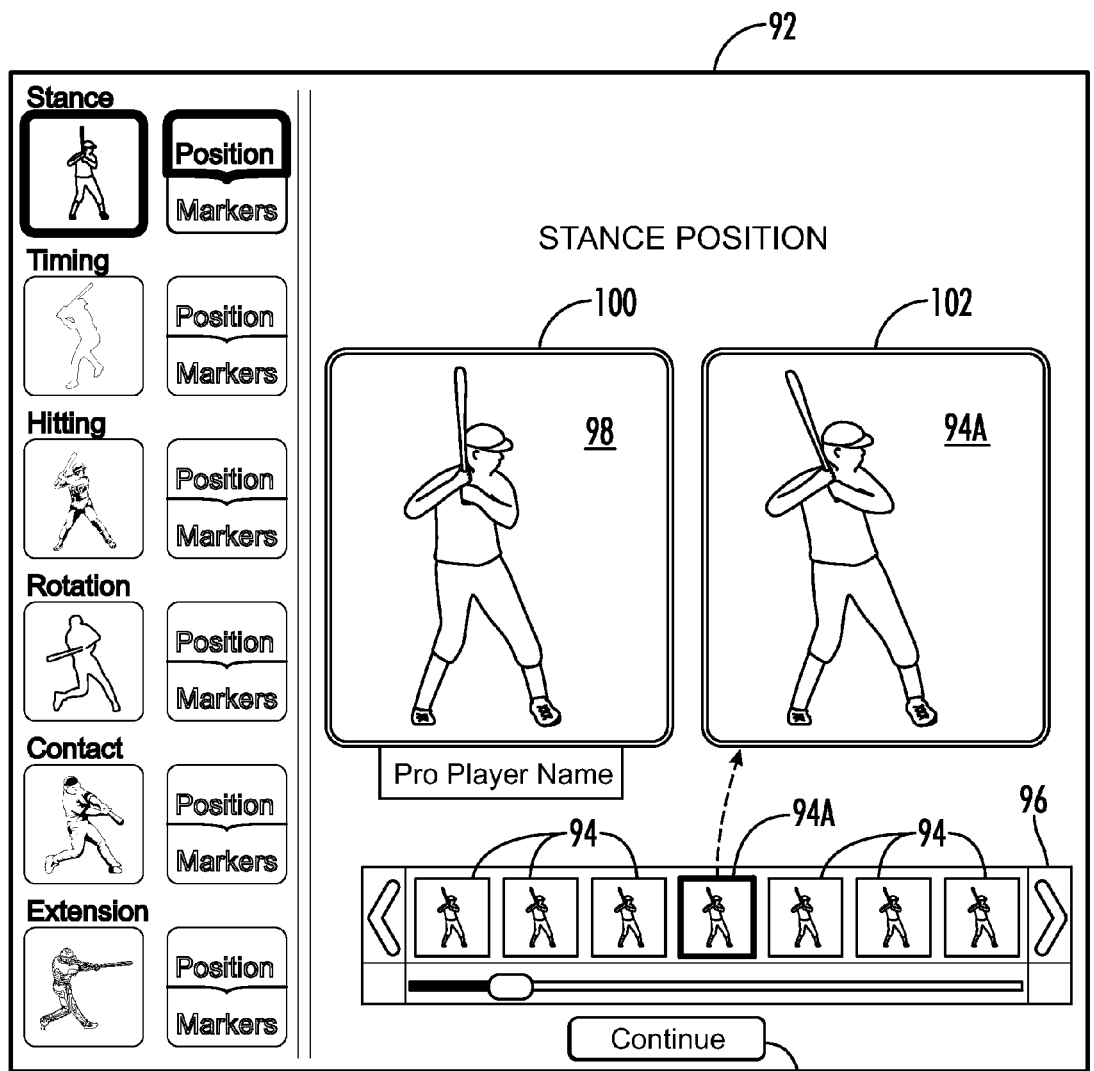
FIG. 6 is an example user interface for facilitating selection of a user image that corresponds to a particular stage of a plurality of consecutive stages.

FIG. 6 is an example user interface 92 for facilitating selection of a particular user image from such a plurality of user images that corresponds to a particular stage of a plurality of consecutive stages. In this embodiment, assume that the server device 14 provides a plurality of user images 94, or thumbnails of such user images 94, to the client device 12. The user interface 92 presents the plurality of user images 94 in a scrollable list 96 for facilitating selection of one the plurality of user images 94 by the user 44. In this example, this stage comprises a stance stage of the plurality of stages of the motion, in this example the swing of a baseball bat. A player image 98 of the comparison player previously selected by the user 44 depicting the selected comparison player in the stance stage may also be displayed in a player image area 100 of the user interface 92. The user 44 may select a user image 94 from the scrollable list 96 of user images 94 that most closely resembles the position of the comparison player in the player image 98 in order to designate a user image 94 that corresponds to the stance stage. Upon selection, such as by double clicking on a particular user image 94A, the selected user image 94A may then be enlarged and displayed in a user image area 102. After selection of the user image 94A, the user 44 may continue to a next step by pressing a continue control 104.

Figure 7:
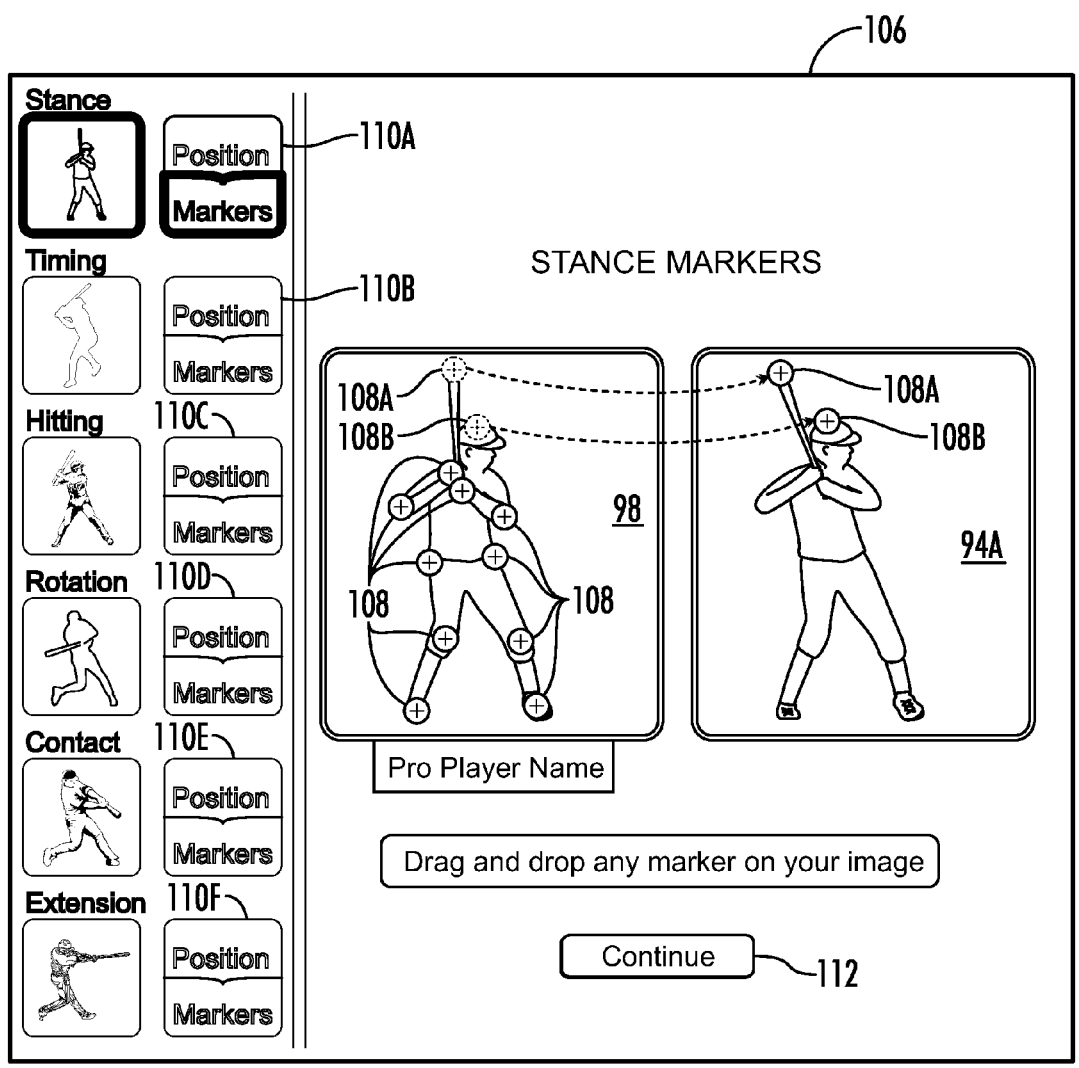
FIG. 7 is an example user interface for facilitating the designation of motion point locations within a selected user image for a stance stage according to one embodiment.

FIG. 7 is an example user interface 106 for facilitating the designation of motion point locations within the selected user image 94A for the stance stage according to one embodiment. In this embodiment, the player image 98 is presented in conjunction with a plurality of motion point designators 108, 108A, 108B (generally, motion point designators 108), referred to in FIG. 7 as "stance markers," which identify a corresponding plurality of motion point locations with respect to the player image 98. For example, the motion point designator 108A designates a motion point location of the tip of a baseball bat depicted in the player image 98. The motion point designator 108B designates a motion point location of the tip of the head of the comparison player depicted in the player image 98. In one embodiment, the user 44 may select the motion point designators 108 and drag the motion point designators to corresponding locations on the user image 94A to identify motion point locations with respect to the user image 94A. After the user 44 has identified each relevant motion point location, the client device 12 may provide the server device 14 with the relevant motion point locations based on the motion point designators 108. This information may be in any suitable format, including, for example, x,y coordinate information that identifies an x,y coordinate of the user image 94A that corresponds to that particular stage. In particular, in accordance with one embodiment, the leftmost and topmost corner of the user image 94A may correspond to the origin, such that x,y coordinates of the origin are 0,0. The x-coordinate of a motion point location may identify the horizontal distance from the origin, and the y-coordinate of a motion point location may identify the vertical distance from the origin.

The user interface 106 may also contain a plurality of selectable icons 110A-110F (generally, selectable icons 110), each of which corresponds to a particular stage of the plurality of consecutive stages of the motion at issue, in this example, the swing of a baseball bat. Each selectable icon 110 may allow the user 44 to select, for each stage of the plurality of consecutive stages, an input mode for either identifying a particular user image 94 from the plurality of user images 94 for that particular stage, or the designation of motion point locations via motion point designators for that particular stage.

Once the user 44 has designated each motion point location on the user image 94A, the user 44 may select a continue control 112, which may allow the user 44 to repeat the process described above with respect to FIGS. 6 and 7 for each stage of the plurality of consecutive stages.

Figure 8:
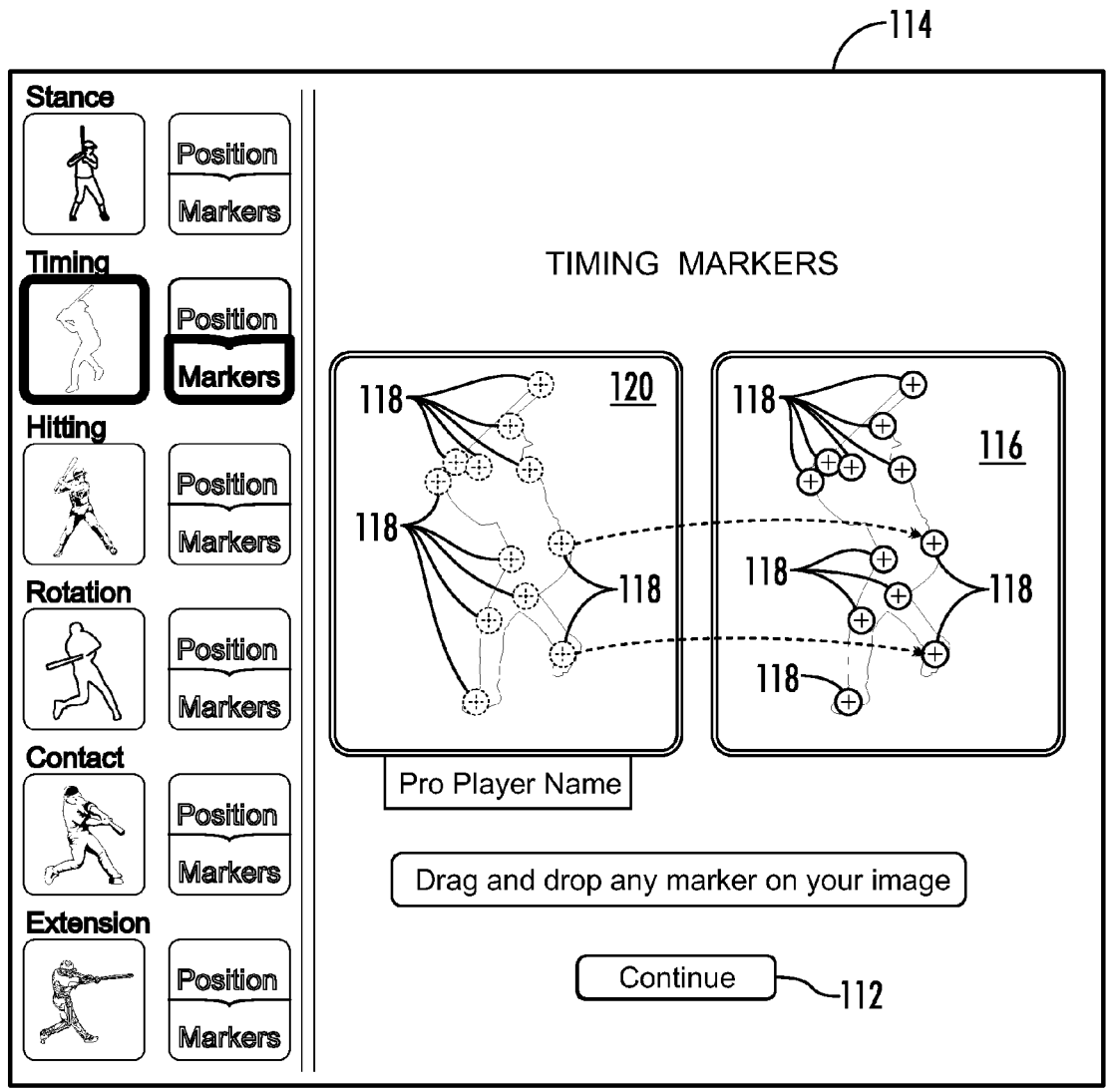
FIG. 8 is an example user interface for facilitating the designation of motion point locations within a selected user image for a timing stage according to one embodiment.

FIG. 8 is an example user interface 114 for facilitating the designation of motion point locations within a selected user image for the timing stage according to one embodiment. Assume that the user 44 has previously selected a user image 116 that corresponds to the timing stage in a manner described above with respect to FIG. 6. The user 44, similar to the manner discussed with respect to FIG. 7, may move a plurality of motion point designators 118 (referred to in FIG. 8 as "TIMING MARKERS") from a player image 120 to the user image 116 to designate motion point locations with respect to the player image 120 for the timing stage.

Figure 9:
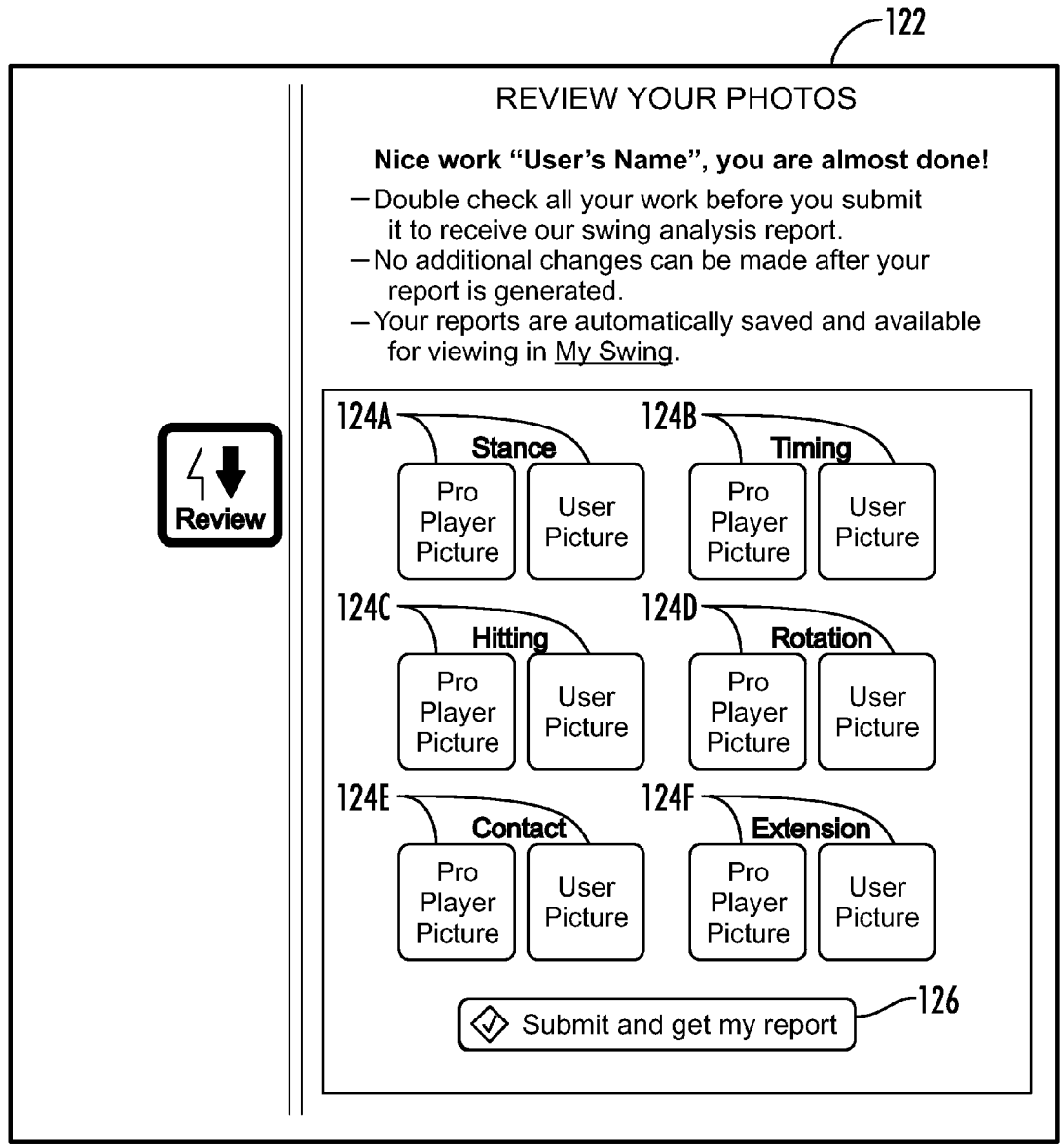
FIG. 9 is an example user interface for facilitating a review by the user prior to initiation of a user motion report, according to one embodiment.

FIG. 9 is an example user interface 122 for facilitating a review by the user 44 prior to initiation of a user motion report, according to one embodiment. The user interface 122 may provide a plurality of pairs of images 124A-124F (generally pairs of images 124), each of which corresponds to a particular stage of the plurality of stages of the motion at issue. Each pair of images 124 may include a player image showing the selected comparison player at that respective stage, and the user image corresponding to that stage, which was selected by the user 44, as discussed above. The pairs of images 124 may be selectable, such that selection of one of the pairs of images 124 allows the user 44 to select a different user image for the particular stage, and re-designate motion point locations, as appropriate. If the user 44 is satisfied with the selection of user images, the user 44 may select a control 126 to initiate the generation of the user motion report.

The server device 14 generates the user motion report based on the motion point locations and reference motion data. The user motion report may be generated substantially in real-time, and in one embodiment may be presented to the user 44 substantially instantaneously after the user 44 has initiated the generation of the user motion report.

Figure 10:
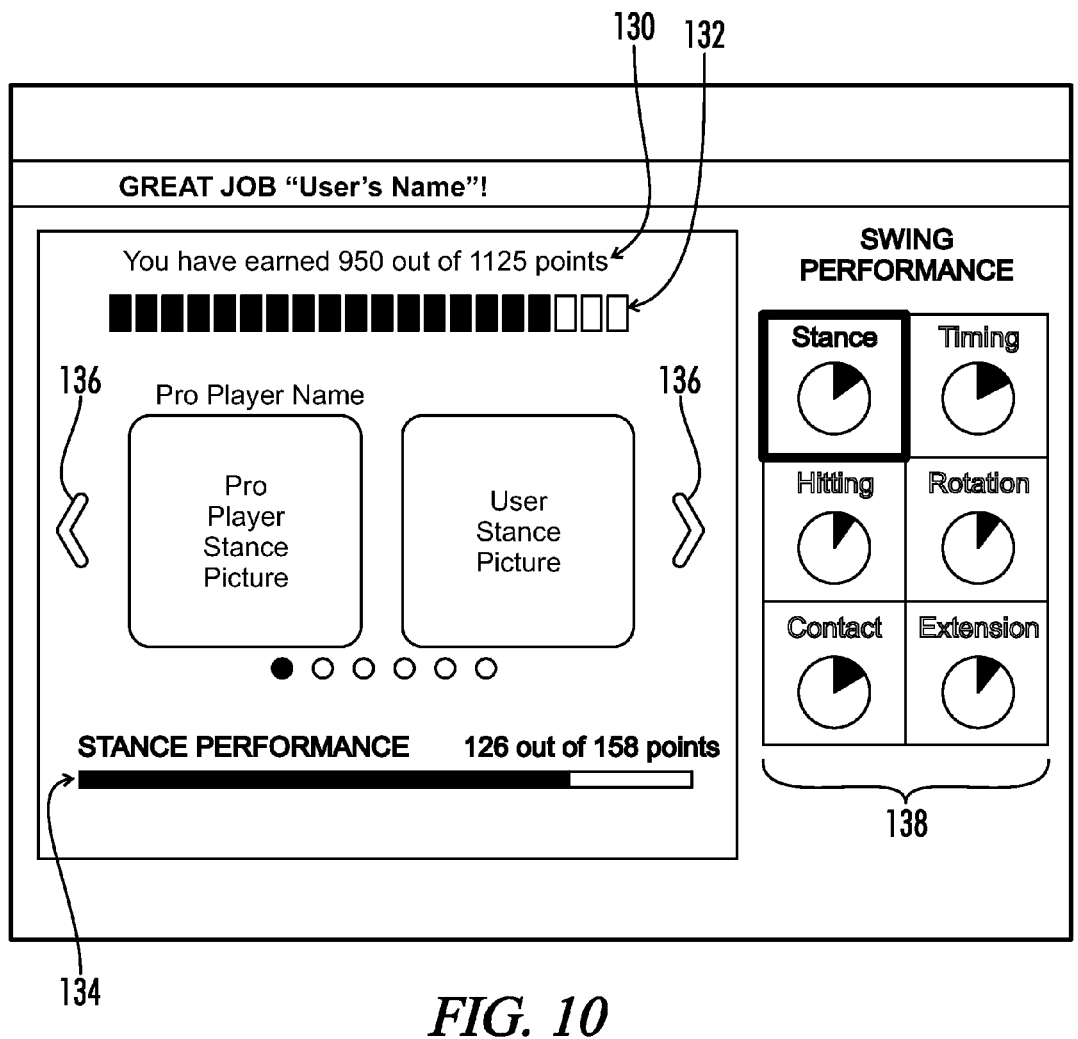
FIG. 10 illustrates an example user interface that depicts a summary portion of an example user motion report.

FIG. 10 illustrates an example user interface 128 that depicts a summary portion of an example user motion report. The summary portion may include an identification 130 of a number of points the user 44 has scored out of a total number of possible points, based on the comparison of the motion point locations to the reference motion data. A bar chart 132 may visually depict the number of points scored versus the total number of possible points. The summary portion may also include an identification 134 of a number of points the user 44 has scored for each stage of the plurality of stages out of a total number of possible points for each stage. The user 44 may be able to selected scroll controls 136 to scroll through each stage and be presented with the results for each stage. An area 138 may provide information, such as via pie charts, identifying the scores of the user 44 for each stage. The pie charts, in one embodiment, may be based on the score of the user 44 for each stage relative to the total points available in such stage. In another embodiment, the pie charts may be based on the total score of the user 44 relative to the total number of points available for all stages.

Figure 11:
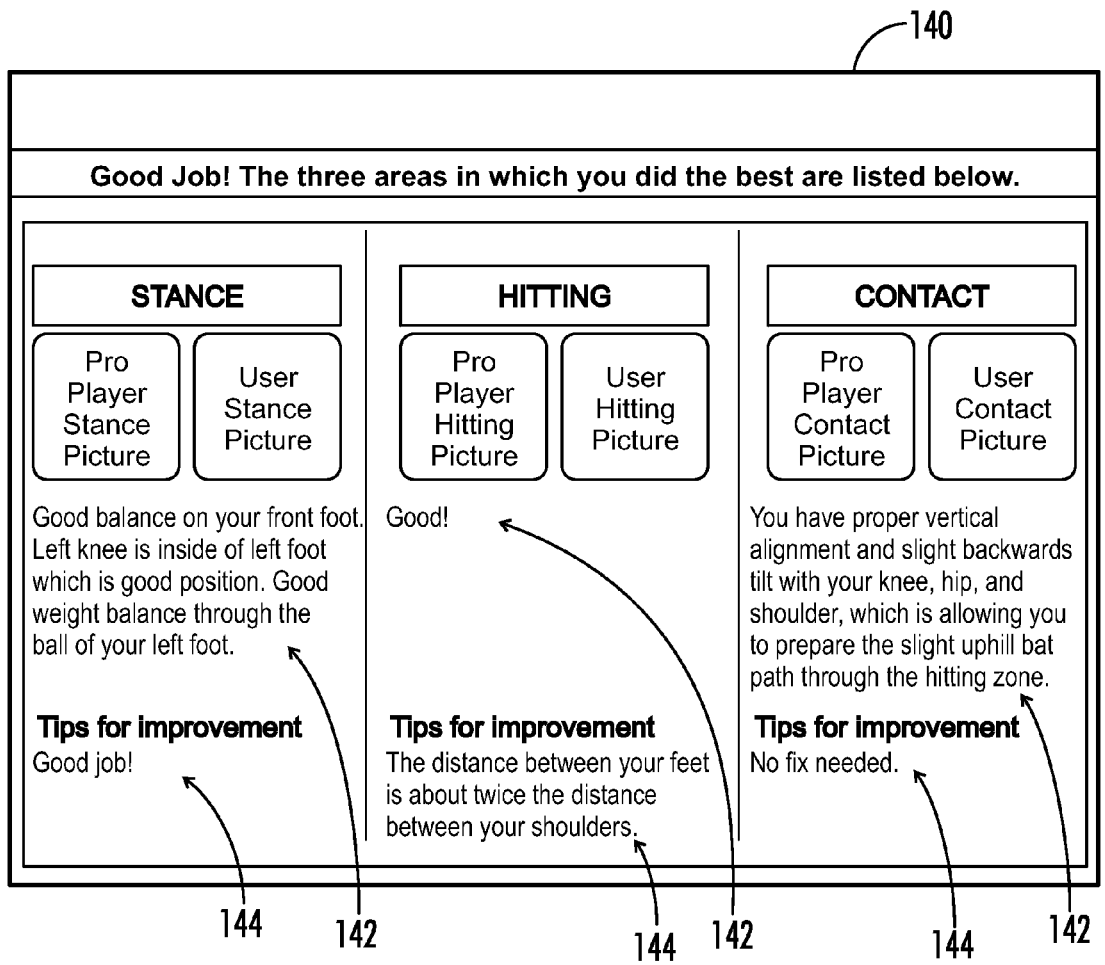
FIG. 11 is an example user interface that may present additional information from the user motion report.

FIG. 11 is an example user interface 140 that may present additional information from the user motion report. The user interface 140 may present, for each stage, or for a selected group of stages, such as the top three stages, comment information 142 which provides comments regarding the corresponding stages. The user interface 140 may also include tip information 144 that provides tips to the user 44 for improving the user motion at this particular stage.

FIG. 12 is an example user interface 146 that may present additional information from the user motion report. The user interface 146 may present, for each stage, information 148, such as comments and tips, that are pertinent to the particular stage based on the comparison between the motion point locations and the reference motion data. In one embodiment an icon, such as a clipboard icon, may be presented in conjunction with a textual description regarding the outcome of the user 44 for a particular comparison. Another icon, such as a baseball icon, may be presented in conjunction with a tip for improving the score of the user 44 for that particular comparison.

Figure 13:
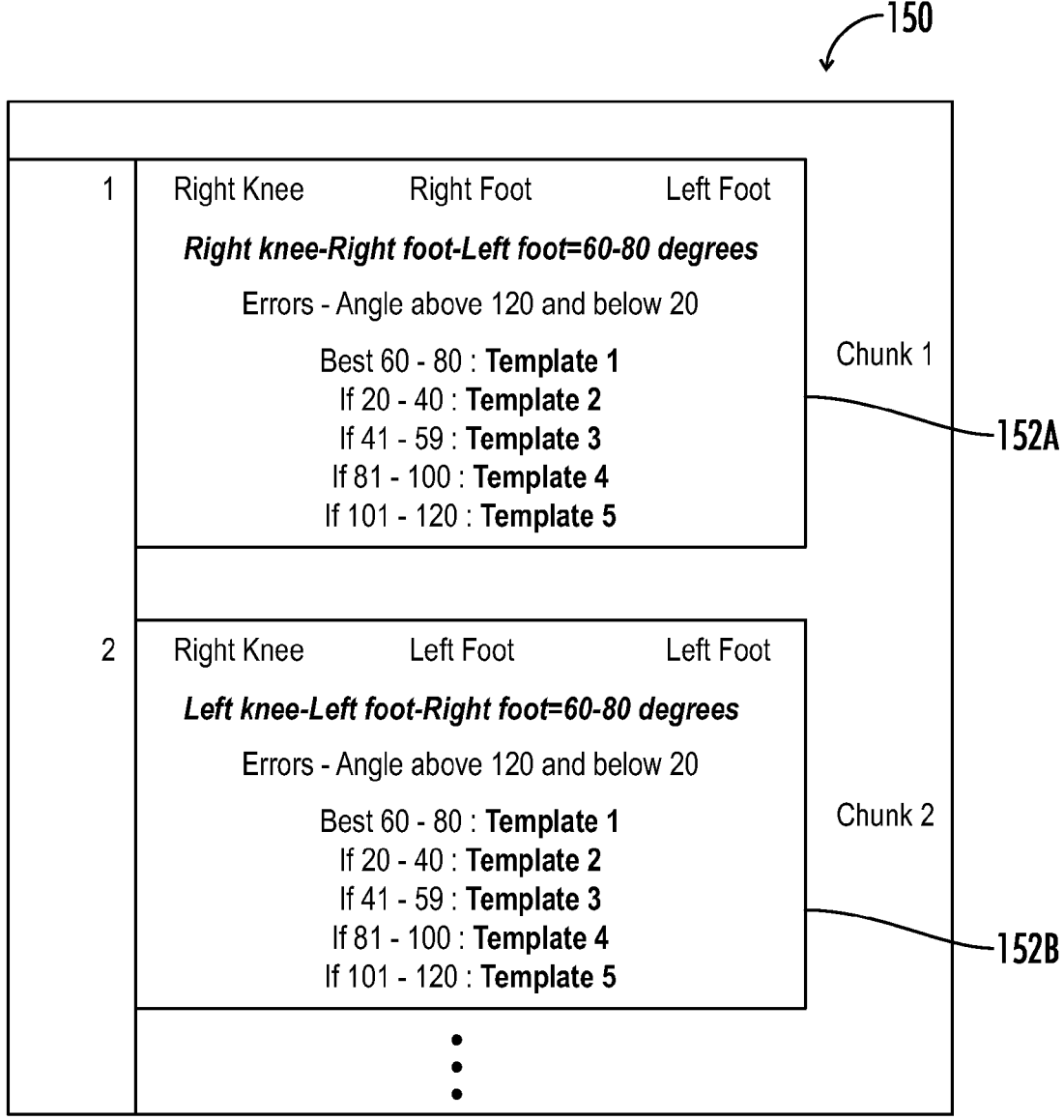
FIG. 13 illustrates example reference motion data associated with a stage of the plurality of consecutive stages.

FIG. 13 illustrates example reference motion data 150 associated with a stage of the plurality of consecutive stages of the motion at issue. In some embodiments, each stage may have a plurality of different metrics, or chunks 152A-152B (generally, chunks 152), that may be used to assess the user motion at that stage. Each chunk 152 may correspond to a particular comparison of reference motion data 150 to motion point locations of the user image that corresponds to the particular stage. As discussed above, the reference motion data 150 may be determined based on the particular motion at issue. While for purposes of illustration only two metrics, or chunks 152, are shown in FIG. 13, each stage may have any number of different chunks 152. The chunk 152A identifies a measurement of three motion point locations, the location of the user 44's right knee, right foot, and left foot. Chunk 152A indicates that an angle above 120 degrees or below 20 degrees constitutes an error. The server device 14, based on the motion point locations on the user image that corresponds to the respective stage, determines the respective angle identified in the chunk 152A. If the respective angle is between 60 degrees and 80 degrees, the server device 14 accesses a particular template of a plurality of templates. If the respective angle is between 20 degrees and 40 degrees, the server device 14 accesses a different template of the plurality of templates. Information from the accessed template may be utilized in the generation of the user motion report, and will be described in greater detail below. This process may be repeated for each chunk in the corresponding stage, and for each stage of the plurality of consecutive stages.

Figure 14:
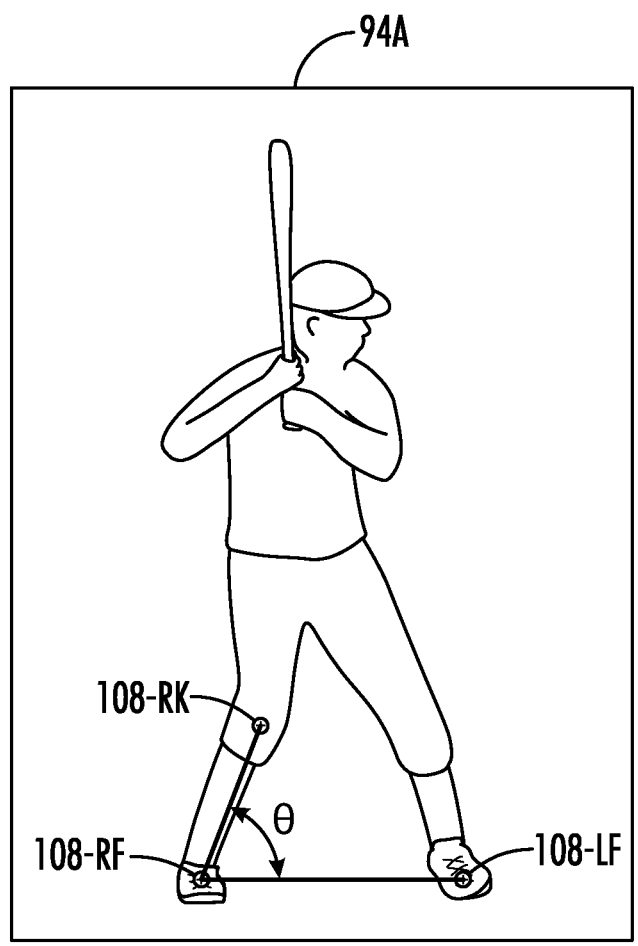
FIG. 14 is a diagram illustrating the determination of a chunk metric according to one embodiment.

FIG. 14 is a diagram illustrating the determination of a chunk metric according to one embodiment. In particular, FIG. 14 illustrates an example determination of the metric defined by the chunk 152A illustrated in FIG. 13. The server device 14, using the three motion point designators 108-RK, 108-RF, and 108-LF, determines an angle θ. The angle θ may then be used to determine the appropriate template, as illustrated in FIG. 13.

FIGS. 15A-15B illustrate example templates 154-1-154-N (generally, templates 154), according to one embodiment. Each template 154 may correspond to a particular chunk 152, and may include information that is used by the server device 14 based on the comparison of the motion point locations and reference motion data 150 that corresponds to the respective chunk 152.

Each template 154 may contain a variety of different data. A stage column 156 may identify the motion stage associated with the particular template 154. A chunk number column 158 may identify the chunk of the particular motion stage with which the template 154 is associated. A positive or negative column 160 indicates, for a negative finding of the chunk result, the relative level of negativity (i.e., how far from the reference motion data 150 the particular chunk result is). A value of "P" means positive (no variation from standard); a value of "N1" means somewhat negative (varying somewhat from standard); and a value of "N2" means very negative (varying significantly from standard). A positive or negative column 162 indicates whether the chunk result is positive or negative (e.g., good=0, bad=1) compared to the reference motion data 150. A level of negativity column 164 contains a numeric value that corresponds to the relative level of negativity identified in the positive or negative column 160.

A template number column 166 identifies the corresponding template number. An overall priority column 168 contains an indicator that ranks the importance of the individual chunk 152 among all chunks 152 in all stages. In one embodiment, the server device 14 may use the indicator to determine which templates 154 of the plurality of templates 154 should be used for an overall summary report. For example, if only three overall positive outcomes are to be presented, the overall priority data in conjunction with the positive or negative column 160 facilitates the selection of which positive outcomes are the three highest priority positive outcomes. Similarly, if only three overall negative outcomes are to be presented, the overall priority data in conjunction with the positive or negative column 160 facilitates the selection of which negative outcomes are the three highest priority negative outcomes.

A chunk priority in stage column 170 contains an indicator that ranks the importance of the respective chunk 152 among all chunks 152 in the respective stage. In one embodiment, the server device 14 may use this indicator to determine which templates 154 of the plurality of templates 154 should be used for a stage-by-stage report. For example, if only three positive outcomes are to be presented for each stage, and only three negative outcomes are to be presented for each stage, the chunk priority data facilitates the selection of such information, similar to that as described above with regard to the overall priority column 168, but on a stage-by-stage basis.

A points column 172 identifies the points associated with the template 154, for use in generating scores for the user motion report. A points rounded column 174 identifies a rounding of the points identified in the points column 172. An output column 176 identifies textual data that may be provided in the user motion report that is associated with the particular chunk result. A fix column 178 identifies tips that may be provided in the user motion report that is associated with the particular chunk result. A dependencies column 180 identifies potential dependencies between templates, usually in multiple stages. For reporting purposes, the dependencies help eliminate providing report data from the same template repeatedly when a similar measurement happens in multiple stages. For example, the user 44 may keep his head still through multiple stages. In such example, if dependent templates are chosen by the server device 14 in multiple stages, then some of the templates are blanked (not reported) in favor of just reporting one of them, and acknowledging once in the user motion report that the same observation occurs in multiple stages.

Those skilled in the art will recognize improvements and modifications to the preferred embodiments of the present disclosure. All such improvements and modifications are considered within the scope of the concepts disclosed herein and the claims that follow.

What is claimed is:

1. A method for generating an analysis of a motion, comprising:
receiving, by a first computing device, image data that includes a set of user images, each user image in the set corresponding to a stage of a plurality of consecutive stages of the motion and depicting a user at the corresponding stage, wherein the motion includes a movement of a sports implement, and each user image in the set of user images depicts the sports implement;

for each stage of the plurality of consecutive stages, providing, to a second computing device, a player image that depicts locations of a plurality of motion points on the player image, for use by the user for generating a set of user-identified motion point designators;

for each stage of the plurality of consecutive stages, receiving the set of user-identified motion point designators, each user-identified motion point designator in the set of user-identified motion point designators designating a motion point location in the corresponding user image; and based on the plurality of motion point locations and reference motion data associated with a reference motion, generating a user motion report.

2. The method of claim 1, wherein the image data comprises a video file, and wherein receiving the image data that includes the set of user images further comprises:
receiving, by the first computing device, the video file;
extracting, from the video file, a plurality of user images;
providing the plurality of user images to a second computing device for presentation to the user; and
receiving, from the second computing device, a plurality of user-identified image identifiers that identify the set of user images from the plurality of user images.

3. The method of claim 1, wherein the image data comprises a video file, and further comprising:
processing the video file to generate a plurality of user images; and
identifying the set of user images from the plurality of user images.

4. The method of claim 1, wherein determining the plurality of motion point locations comprises:
for each stage of the plurality of consecutive stages, processing the corresponding user image to identify the plurality of motion point locations in the corresponding user image, each motion point location respectively corresponding to a particular motion point of a plurality of motion points associated with the each stage.

5. The method of claim 1, wherein the sports implement comprises one of a baseball bat, a golf club, a tennis racket, a hockey stick, a lacrosse stick, a ping pong paddle, a racquetball racket, an oar, a badminton racket, and a squash racket.

6. The method of claim 1, wherein the sports implement comprises a baseball bat, and the plurality of consecutive stages comprises a stance stage, a timing transition stage, a hitting position stage, a rotation stage, a contact stage, and an extension stage.

7. The method of claim 1, further comprising:
receiving, from the user, a selection of a comparison player;
obtaining a set of player images that is associated with the comparison player, each player image in the set of player images depicting the comparison player at a stage of the plurality of consecutive stages; and
sending to a second computing device image pairs, each image pair comprising a user image from the set of user images that corresponds to a particular stage of the plurality of consecutive stages and a player image from the set of player images that corresponds to the particular stage.

8. The method of claim 1, wherein generating the user motion report further comprises:
for each stage of the plurality of consecutive stages:
comparing at least two motion point locations to the reference motion data;
based on the comparison, accessing a particular template of a plurality of templates; and
determining a comparison sub-score based on the particular template.

9. The method of claim 8, further comprising:
for each stage of the plurality of consecutive stages:
aggregating a plurality of comparison sub-scores to determine a stage score;
aggregating a plurality of stage scores to determine a cumulative user motion score; and
wherein the user motion report includes the cumulative user motion score.

10. The method of claim 8, further comprising:
determining a tip for improving the sub-score based on the particular template; and
wherein the user motion report includes the tip.

11. The method of claim 10, wherein the user motion report further comprises a total possible motion score.

12. The method of claim 1, further comprising:
receiving, from the user, a selection of a comparison player;
obtaining a set of player images that is associated with the comparison player, each player image in the set of player images depicting the comparison player at a stage of the plurality of consecutive stages; and
wherein the user motion report comprises a plurality of image pairs, each image pair comprising a user image from the set of user images that corresponds to a particular stage of the plurality of consecutive stages and a player image from the set of player images that corresponds to the particular stage, and a stage score identifying a score of the user based on the plurality of motion point locations in the user image that corresponds to the stage.

13. A computing device for generating an analysis of a motion, comprising:
a communications interface configured to communicate with a network; and
a controller comprising a processor and coupled to the communications interface, the controller configured to:
receive image data that includes a set of user images, each user image in the set corresponding to a stage of a plurality of consecutive stages of the motion and depicting a user at the corresponding stage, wherein the motion includes a movement of a sports implement, and each user image in the set of user images depicts the sports implement;
for each stage of the plurality of consecutive stages, provide, to a second computing device, a player image that depicts locations of a plurality of motion points on the player image, for use by the user for generating a set of user-identified motion point designators;
for each stage of the plurality of consecutive stages, receive the set of user-identified motion point designators, each user-identified motion point designator in the set of user-identified motion point designators designating a motion point location in the corresponding user image; and
based on the plurality of motion point locations and reference motion data associated with a reference motion, generate a user motion report.

14. A computer program product for generating an analysis of a motion, the computer program product stored on a non-transitory computer-readable storage medium and including instructions configured to cause a processor to carry out the steps of:

receiving image data that includes a set of user images, each user image in the set corresponding to a stage of a plurality of consecutive stages of the motion and depicting a user at the corresponding stage, wherein the motion includes a movement of a sports implement, and each user image in the set of user images depicts the sports implement;

for each stage of the plurality of consecutive stages, providing, to a second computing device, a player image that depicts locations of a plurality of motion points on the player image, for use by the user for generating a set of user-identified motion point designators;

for each stage of the plurality of consecutive stages, receiving the set of user-identified motion point designators, each user-identified motion point designator in the set of user-identified motion point designators designating a motion point location in the corresponding user image; and based on the plurality of motion point locations and reference motion data associated with a reference motion, generating a user motion report.

* * * * *